(12) United States Patent
Barwicz et al.

(10) Patent No.: US 9,656,420 B2
(45) Date of Patent: May 23, 2017

(54) BONDLINE CONTROL FIXTURE AND METHOD OF AFFIXING FIRST AND SECOND COMPONENTS

(71) Applicant: International Business Machines Corporation, Armonk, NY (US)

(72) Inventors: Tymon Barwicz, Yorktown Heights, NY (US); Nicolas Boyer, Quebec (CA); Paul Fortier, Quebec (CA); Stephane Harel, Quebec (CA); Roch Thivierge, Quebec (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 14/700,738

(22) Filed: Apr. 30, 2015

(65) Prior Publication Data
US 2016/0318240 A1 Nov. 3, 2016

(51) Int. Cl.
*B29C 65/00* (2006.01)
*B29C 65/48* (2006.01)
(Continued)

(52) U.S. Cl.
CPC ........ *B29C 65/483* (2013.01); *B29C 65/7847* (2013.01); *B29C 66/1122* (2013.01); *B29C 66/474* (2013.01); *B29C 66/8163* (2013.01); *B29C 66/8242* (2013.01); *B29C 66/82421* (2013.01); *B29C 66/8322* (2013.01); *B29C 66/863* (2013.01); *B29D 11/00663* (2013.01); *G02B 6/12* (2013.01); *G02B 6/12004* (2013.01);
(Continued)

(58) Field of Classification Search
USPC .......................................................... 29/834
See application file for complete search history.

(56) References Cited

U.S. PATENT DOCUMENTS

| 4,906,920 A | 3/1990 | Huff et al. |
| 5,046,239 A | 9/1991 | Miller et al. |

(Continued)

FOREIGN PATENT DOCUMENTS

EP 0484141 A2 * 10/1991

OTHER PUBLICATIONS

List of IBM Patents or Patent Applications Treated as Related; (Appendix P), Filed Aug. 5, 2015; 2 pages.

(Continued)

*Primary Examiner* — Jeff Aftergut
(74) *Attorney, Agent, or Firm* — Cantor Colburn LLP; Vazken Alexanian

(57) ABSTRACT

A bondline control fixture and an active bondline control fixture are provided for affixing first and second components. The bondline control fixture includes a base fixable relative to a first component maneuvering device and comprising a first body defining an aperture and a first chamber and a second body disposable within the first chamber and defining a second chamber, a flexible membrane disposable to seal the second chamber, a mobile plate to which the second component is removably attachable, the mobile plate being disposable in contact with the flexible membrane and a pressure regulating system coupled to the second body and configured to regulate a pressure within the second chamber to deform the flexible membrane.

17 Claims, 7 Drawing Sheets

(51) Int. Cl.
*B29C 65/78* (2006.01)
*B29D 11/00* (2006.01)
*G02B 6/30* (2006.01)
*G02B 6/12* (2006.01)
*B29L 31/34* (2006.01)

(52) U.S. Cl.
CPC ............ *G02B 6/30* (2013.01); *B29C 66/9221* (2013.01); *B29C 66/9231* (2013.01); *B29L 2031/3425* (2013.01)

(56) References Cited

U.S. PATENT DOCUMENTS

| | | | |
|---|---|---|---|
| 5,583,445 | A | 12/1996 | Mullen |
| 5,600,749 | A | 2/1997 | Lee et al. |
| 6,048,750 | A * | 4/2000 | Hembree ............ H01L 21/681 438/107 |
| 6,093,249 | A | 7/2000 | Curtin |
| 6,198,580 | B1 | 3/2001 | Dallakian |
| 6,774,651 | B1 * | 8/2004 | Hembree ............ H01L 21/681 324/750.19 |
| 6,822,798 | B2 | 11/2004 | Wu et al. |
| 8,724,937 | B2 | 5/2014 | Barwicz et al. |
| 8,752,283 | B2 | 6/2014 | Barwicz et al. |

OTHER PUBLICATIONS

Tymon Barwicz et al., "Bondline Control Fixture and Method of Affixing First and Second Components", U.S. Appl. No. 14/748,465, filed Jun. 24, 2015.

D. D. Evans et al., "Micron level placement accuracy case studies for optoelectronic products," 59th Electronic Components and Technology Conference, 2009. ECTC 2009, pp. 1937-1941.

* cited by examiner

BONDLINE CONTROL FIXTURE AND METHOD OF AFFIXING FIRST AND SECOND COMPONENTS

BACKGROUND

The present invention relates to assembly of micro-electronics, opto-electronics and photo-electronics and, more particularly, to a bondline control fixture, an active bondline control fixture and a method of passively or actively affixing first and second components.

In various technologies, there is frequently a need for attaching two standard pick and place components together. In some cases, the components may include a flexible polymer component with a standard optical interface and polymer waveguides extending outwardly from a side of the interface along a lower surface of a compliant extension and a photonic integrated circuit (IC) with photonic IC waveguides on an upper surface of a complementary metal-oxide-semiconductor (CMOS) element. Previously, one of the components has been picked up with a picker arm and placed on the other component with that other component residing on a base. Both the picker arm and the base may move in X-, Y- and Z-directions in order to position the components with respect to each other.

However, no specific control is used to ensure that the parallelism between the picker arm and base surfaces is tightly controlled. In the case of the components being the flexible polymer component and the photonic integrated circuit (IC), this lack of parallelism impedes the enablement of an adiabatic coupling of light signals from the polymer waveguides to the photonic IC waveguides.

SUMMARY

According to an embodiment of the present invention, a bondline control fixture for affixing first and second components is provided. The bondline control fixture includes a base fixable relative to a first component maneuvering device and comprising a first body defining an aperture and a first chamber and a second body disposable within the first chamber and defining a second chamber, a flexible membrane disposable to seal the second chamber, a mobile plate to which the second component is removably attachable, the mobile plate being disposable in contact with the flexible membrane and a pressure regulating system coupled to the second body and configured to regulate a pressure within the second chamber to deform the flexible membrane.

According to another embodiment, an active bondline control fixture for affixing first and second components is provided and includes a base fixable relative to a first component maneuvering device, the base defining an aperture and a chamber, a mobile plate to which the second component is removably attachable, the mobile plate being disposable at least partly in the aperture and an actively controllable actuation system configured to adjust an altitude of the mobile plate relative to the base in accordance with a degree of parallelism between the first and second components.

According to yet another embodiment, a method of passively or actively affixing first and second components is provided. The method includes supporting a mobile plate on a base fixable relative to a first component maneuvering device, removably attaching the second component to the mobile plate, dispensing adhesive on either the first or the second component, maneuvering the first component toward the second component with the first component maneuvering device and manipulating the mobile plate to increase a degree of parallelism between the first and second components.

DETAILED DESCRIPTION

As will be described below, a passive or active bondline control fixture is provided for passively or actively increasing a degree of parallelism between first and second pick and place components, such as a flexible component with a standard optical interface and polymer waveguides near the side of the interface along a lower surface of a compliant extension and a photonic integrated circuit (IC) with photonic IC waveguides near an upper surface. The photonic IC could be a complementary metal-oxide-semiconductor (CMOS) element. Use of the passive or active bondline control fixture allows the first component to be affixed to the second component so that efficient optical coupling of light signals from the waveguides of the first component to the photonic IC waveguides of the second component is enabled without need for micro-adjustments of a picker arm of the first component. Various light coupling schemes could be used such as adiabatic coupling, directional, coupling or butt coupling.

Figure 1:
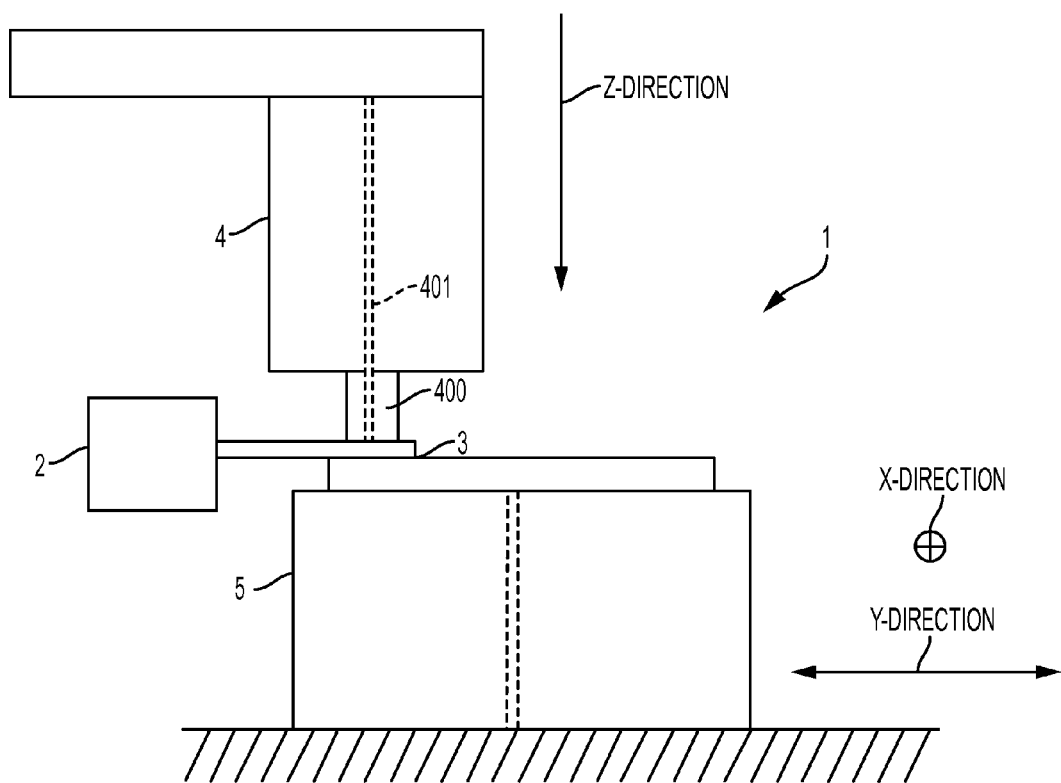
FIG. 1 is a schematic side view of an apparatus in accordance with embodiments.
Figure 2:
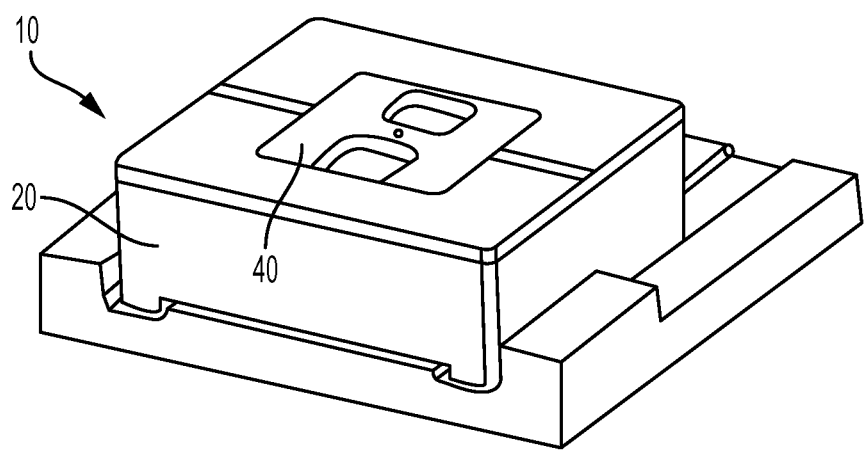
FIG. 2 is a perspective view of a bondline control fixture in accordance with embodiments.
Figure 3:
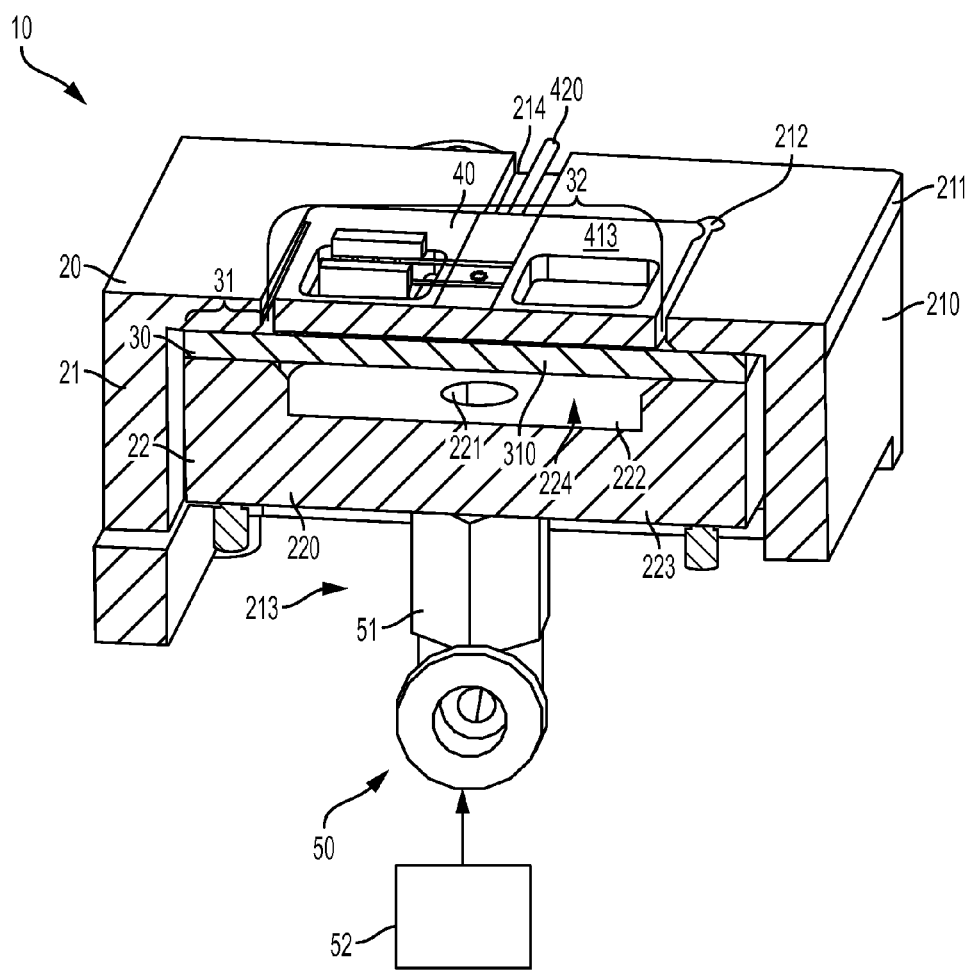
FIG. 3 is a cutaway view of the bondline control fixture of FIG. 2.
Figure 4:
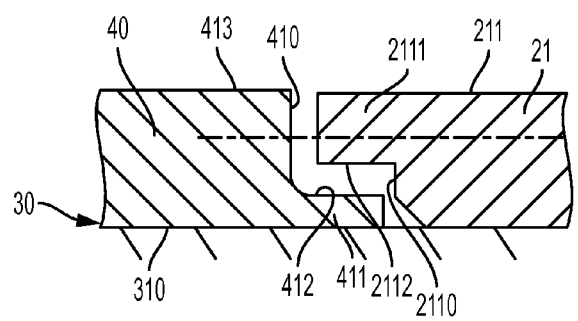
FIG. 4 is an enlarged side view of a portion of the bondline control fixture of FIG. 3.

With reference to FIG. 1, an apparatus 1 is provided for bringing together and affixing to one another standard pick and place fixtures such as a first component 2 and a second component 3. The apparatus 1 generally includes a picker arm 4 that is configured to pick up and maneuver the first component 2 by way of vacuum pressure and a base 5, which is fixed relative to ground and the picker arm 4 and on which the second component 3 is mounted and held by vacuum pressure. During operation, a tip 400 of the picker arm 4 contacts the first component 2 and a vacuum 401 of the picker arm 4 engages to permit the picker arm 4 to lift the first component 2. The picker arm 4 then moves the first component 2 in the X- and Y-directions until the first component 2 is positioned over the second component 3. Next, the picker arm 4 moves the first component 2 in the Z direction toward the second component 3 until they come into contact. Upon contact, adhesive between the first and second components 2 and 3 is permitted to cure.

In accordance with embodiments, the first component 2 may be, for example, a flexible polymer component with a standard optical fiber interface and polymer waveguides near the side of the interface along a lower surface of a compliant extension. The second component may be, for example, a photonic integrated circuit (IC) with photonic IC waveguides on an upper surface. The photonic IC can be a complementary metal-oxide-semiconductor (CMOS) element. In affixing the first component 2 to the second component 3, efficient coupling of light signals from the polymer waveguides of the first component 2 to the photonic IC waveguides of the second component 3 is enabled. However, achieving such an enabling configuration requires that a distance or Z-gap between the first and second components 2 and 3 be very small and well controlled (e.g., less than two microns and preferably less than one micron level) along a significant area of proximity between the first and second components 2 and 3. This area includes notable extents of waveguides placed at the surface or in proximity of the surface on both the first and second components 2 and 3.

Thus, with reference to FIGS. 2-4, 5A and 5B and 6A-6E, a bondline control fixture 10 is provided and is capable of making and adjusting a parallelism of standard pick and place fixtures (i.e., the first and second components 2 and 3 of FIG. 1) to the tolerances needed to enable efficient coupling of the light signals from waveguides of the first component 2 to the photonic IC waveguides of the second component 3. To this end, the bondline control fixture 10 includes a base 20, a flexible membrane 30 (see FIGS. 3-5A and 5B), a mobile plate 40 and a pressure regulating system 50 (see FIG. 3). The base 20 is fixable relative to ground and a first component maneuvering device (i.e., the picker arm 4 of FIG. 1) and includes a first body 21 and a second body 22.

The first body 21 may be generally volumetric with sidewalls 210 and an upper work surface 211 that is supported on the sidewalls 210. The sidewalls 210 and the upper work surface 211 cooperatively define an aperture 212, a first chamber 213 and a groove 214. The upper work surface 211 has an inwardly facing surface 2110 and a flange 2111 that extends inwardly from an upper portion of the inwardly facing surface 2110. The aperture 212 is generally defined in a plane of the upper work surface 211 by the inwardly facing surface 2110 and the flange 2111. The flange 2111 has a lower surface 2112. The first chamber 213 is generally defined below the aperture 212 and the plane of the upper work surface 211 and is delimited by interior facing surfaces of the sidewalls 210 and the upper work surface 211. The groove 214 is generally defined in the plane of the upper work surface 211 and is communicative with the aperture 212.

The second body 22 is disposable within the first chamber 213 of the first body 21 and includes a main body 220 formed to define an inlet 221 and having an upper surface 222 and a peripheral ridge 223. The peripheral ridge 223 runs along a periphery of the upper surface 222 such that the peripheral ridge 223 and a central section of the upper surface 222 define a second chamber 224, which is fluidly communicative with the inlet 221.

The flexible membrane 30 may be formed of rubberized material and is disposable to seal the second chamber 224. The flexible membrane 30 includes a first section 31 and a second section 32 and has a thickness that is substantially similar to a distance between the interior facing surface of the upper work surface 211 of the first body 21 and the peripheral ridge 223 of the second body 22. The first section 31 is interposable and tightly fittable between the first and second bodies 21 and 22 and, in particular, between the interior facing surface of the upper work surface 211 of the first body 21 and the peripheral ridge 223 of the second body 22. The second section 32 is defined within the first section 31 and is thus disposable to seal or in some cases hermetically seal the second chamber 224. With the second chamber 224 pressurized at atmospheric pressure, an upper surface 310 of the flexible membrane 30 may be substantially coplanar with a plane of the interior facing surface of the upper work surface 211.

The mobile plate 40 is disposable within the first chamber 213 of the first body 21 and in the aperture 212. The mobile plate 40 includes a body having an exterior facing surface 410 and a footer 411. The footer 411 extends outwardly from a lower portion of the exterior facing surface 410 and has an upper flange surface 412. The lower surface 2112 of the flange 2111 of the upper work surface 21 and the upper flange surface 412 overlap with one another such that, as the mobile plate 40 is raised, the upper flange surface 412 contacts the lower surface 2112 to thereby limit an upward motion of the mobile plate 40.

The mobile plate 40 is disposable in contact with the upper surface 310 of the flexible membrane 30. As such, the mobile plate 40 effectively floats on the flexible membrane 30 and can be maneuvered or re-oriented in accordance with a condition of the flexible membrane 30.

The mobile plate 40 further includes an uppermost surface 413 on which, e.g., the second component 3 of FIG. 1 is removably attachable by way of, for instance, vacuum pressure. This vacuum pressure may be generated by a vacuum system 42 including a hose 420 that extends along the groove 214. In addition, adhesive may be dispensed on the uppermost surface 413 to increase a degree of bonding of the second component 3 to the uppermost surface 413.

The pressure regulating system 50 is coupled to the second body 22 and is configured to regulate a pressure within the second chamber 224 that is sufficient to deform the flexible membrane 30 toward the mobile plate 40 or to permit deforming of the flexible membrane 30 in the opposite direction. In accordance with embodiments, the pressure regulating system 50 may include a hose 51, which is coupled to the inlet to thereby direct pressurizing fluid into the second chamber 224, and, in some cases, a controller 52. Where the pressure regulating system 50 includes the controller 52, the controller 52 monitors a pressure within the second chamber 224 and increases or decreases the pressure in accordance with a compressive force between the first and second components 2 and 3 and cure characteristics of any adhesive used between the first and second components 2 and 3. In the case where the pressure within the second chamber 224 is sufficient to deform the flexible membrane 30 toward the mobile plate 40, the pressure has to be limited to such a level that the compressive force between the first and second components 2 and 3 will be sufficient to push down the upper flange surface 412 of the mobile plate 40 off its resting position against the lower surface 2112 of the upper work surface 211 of the first body 21.

Figure 5A:
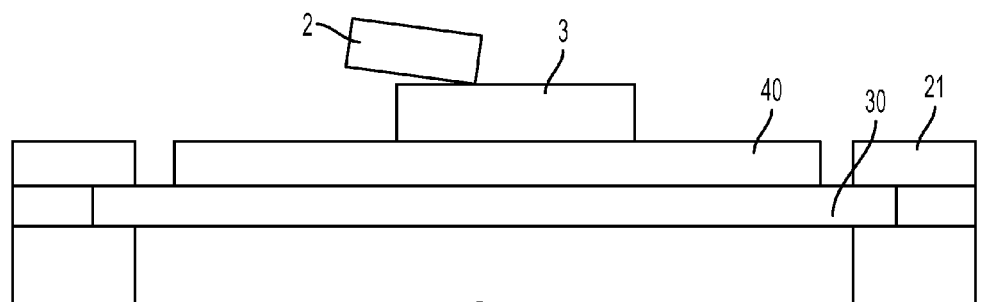
FIG. 5A is a side view of first and second components being brought together in a non-parallel orientation.
Figure 5B:
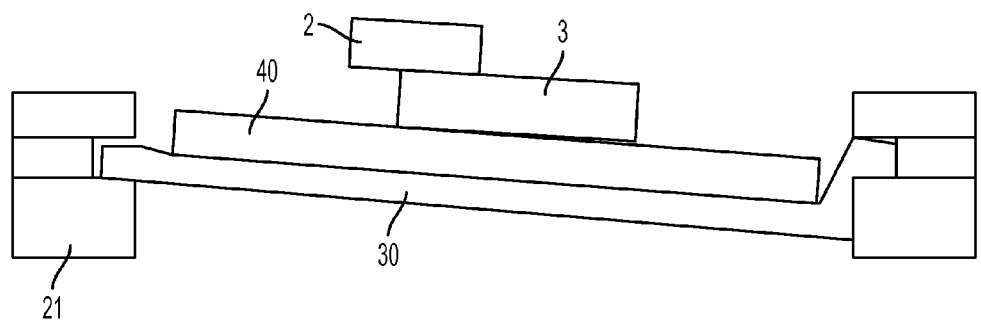
FIG. 5B is a side view of the first and second components being brought together in a parallel orientation.

With reference to FIGS. 5A and 5B, in one embodiment, the flexible characteristic of the flexible membrane 30 and the pressure within the second chamber 224 permits a certain degree of rotational or translational movement of the mobile plate 40 within the aperture 212. In such cases, as the first and second components 2 and 3 are brought together in a non-parallel orientation (see FIG. 5A), the flexible membrane 30 deforms downwardly, which can in some cases result in reducing a volume of the second chamber 224. This causes the mobile plate 40 to rotate to therefore bring the first and second components 2 and 3 into a more parallel orientation.

As shown in FIGS. 6A-6E an alternative operation of the bondline control fixture 10 as described above will now be described. In this embodiment, the second chamber 224 is pressurized to inflate the flexible membrane 30. The flexible membrane 30 is thus deformed or curved upwardly and to create a tangential contact between the upper surface 310 of the flexible membrane 30 and the mobile plate 40. Such tangential contact permits a certain degree of rotational or translational movement of the mobile plate 40 within the aperture 212 to the extent permitted by the interference between the upper flange surface 412 of the mobile plate 40 and the lower surface 2112 of the upper work surface 211 (which has the secondary result in an increased contact area between the mobile plate 40 and the flexible membrane 30).

Figure 6A:
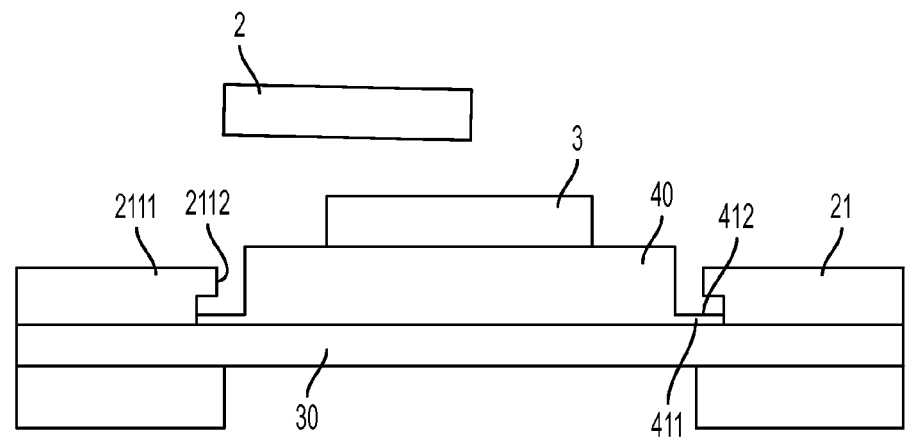
FIG. 6A is a side view of first and second components being brought together in a non-parallel orientation.
Figure 6B:
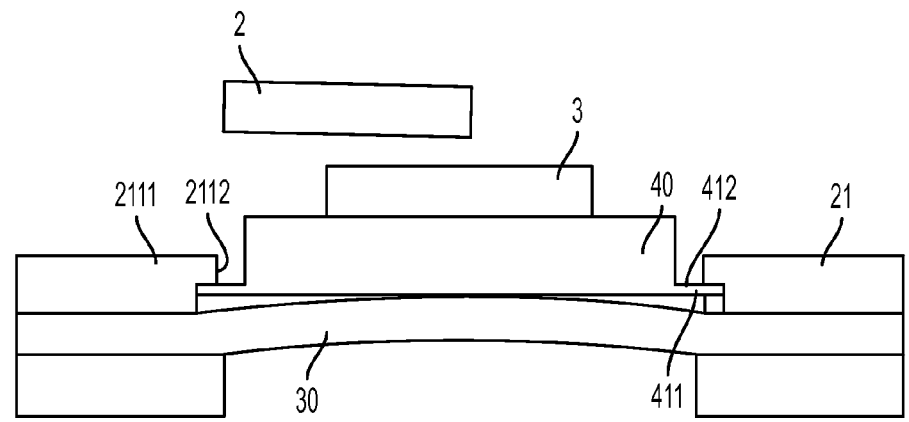
FIG. 6B is a side view of the first and second components being brought together in the non-parallel orientation with a flexible membrane being inflated.
Figure 6C:
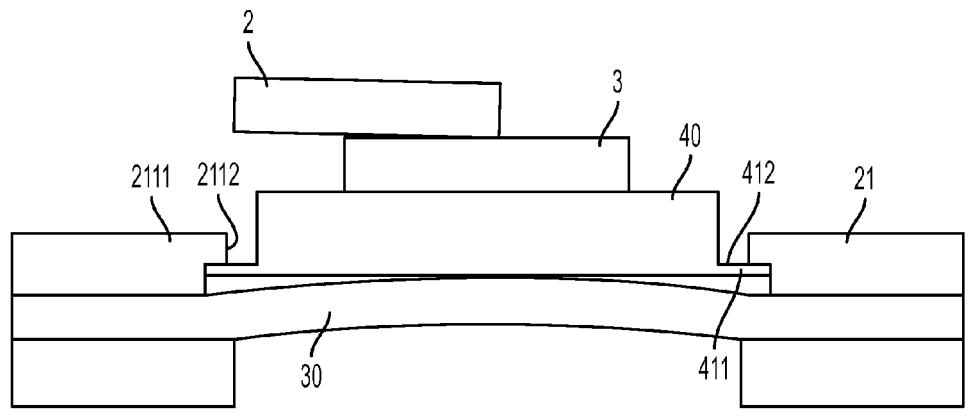
FIG. 6C is a side view of the first and second components being brought into contact in the non-parallel orientation with the flexible membrane being inflated.

At an initial time, as shown in FIG. 6A, the first and second components 2 and 3 are brought toward one another with the second chamber 224 un-pressurized and the flexible member 30 un-deformed. Then, as shown in FIG. 6B, the second chamber 224 may be pressurized such that the mobile plate 40 will be urged upwardly until the upper flange surface 412 rests against the lower surface 2112. Next, as shown in FIG. 6C, the first and second components 2 and 3 are brought together in the Z-direction and in a non-parallel relative orientation.

Figure 6D:
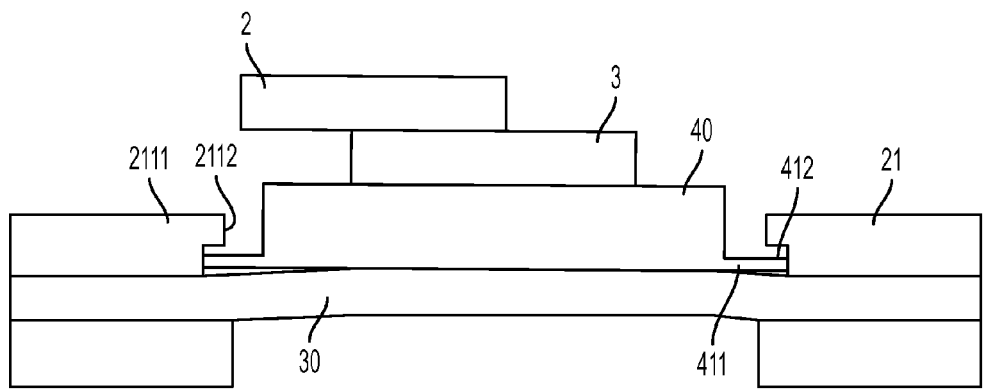
FIG. 6D is a side view of the first and second components in contact in a parallel orientation with an inflated flexible membrane being deformed.
Figure 6E:
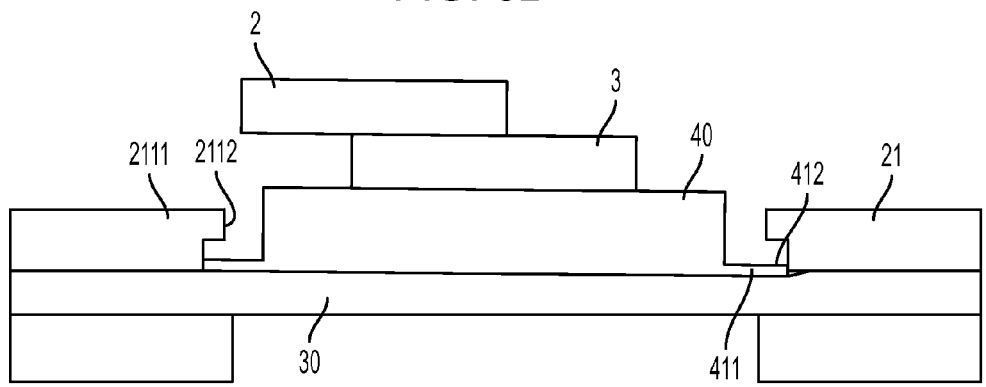
FIG. 6E is a side view of the first and second components in contact in the parallel orientation with the inflated flexible membrane being further deformed.

As the first and second components 2 and 3 continue to come into contact, as shown in FIGS. 6D and 6E, the compressive forces between the first and second components 2 and 3 exceed the pressure generated within the second chamber 224 and the mobile plate 40 is forced downwardly such that the upper flange surface 412 recedes from the lower surface 2112. In this condition, the mobile plate 40 is effectively rotated along the upper surface 310 of the flexible membrane 30, which will be non-uniformly deformed. This rotation of the mobile plate 40 brings the first and second components 2 and 3 into a parallel relative orientation without requiring any micro-adjustments being made by the first component maneuvering device (i.e., the picker arm 4 of FIG. 1). Once the parallel relative orientation is achieved with the first and second components 2 and 3 in contact, the adhesive used between the first and second components 2 and 3 can be cured.

For instance, an optically transparent UV-curable adhesive could be used. The optical transparence should be to the wavelength of the light signals coupled between component 2 and 3 and is important to minimize optical coupling loss. A refractive index of the adhesive should be below a refractive index of a waveguide on component 2. A UV-curable adhesive could improve throughput via fast tacking or cure compared with a thermally cured adhesive.

It will be appreciated that the second chamber 224 can be pressurized prior to assembly to a level not forcing plate 40 to fully rest upper flange surface 412 on lower surface 2112. The contact between 412 and 2112 prior to assembly can full, partial or none. The amount of pressure in chamber 224 depends on the desired assembly force and the resulting desired assembly pressure between component 2 and 3. The desired assembly pressure is a function of the viscosity of the adhesive and the stiffness and mechanical robustness of components 2 and 3. The larger the adhesive viscosity and the larger the component stiffness and mechanical robustness, the larger the desired assembly force.

Figure 7:
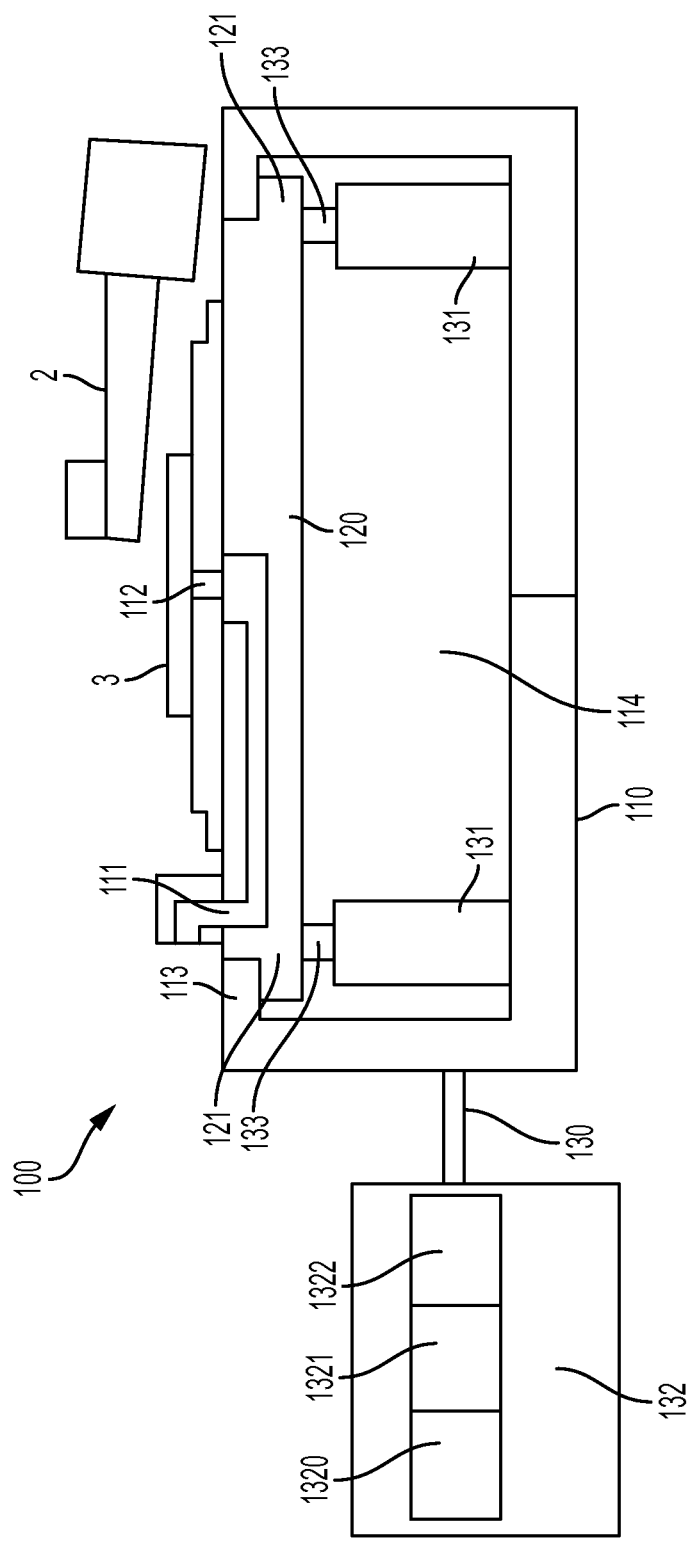
FIG. 7 is a side view of an active bondline control fixture in accordance with embodiments.

With reference to FIG. 7, an active bondline control fixture 100 is provided for affixing the first and second components 2 and 3. The active bondline control fixture 100 includes similar features as those of the bondline control fixture 10 described above and a detailed description of those features will be omitted. The active bondline control fixture 100 includes a base 110, which is fixable relative to a first component maneuvering device (i.e., the picker arm of FIG. 1) and which defines an aperture 111 and a groove 112 in an upper work surface 113 thereof and a chamber 114, a mobile plate 120 and an actively controllable actuation system 130. The second component 3 is removably attachable to the mobile plate 120 by way of vacuum pressure and is movably (i.e., rotatably or translationally) disposable at least partly in the aperture 111. The actively controllable actuation system 130 is configured to adjust an attitude of the mobile plate 120 relative to the base 110 in accordance with a degree of parallelism between the first and second components 2 and 3.

In accordance with embodiments, the actively controllable actuation system 130 includes a plurality of actuators 131. The actuators 131 are disposed within the chamber 114 and are respectively coupled at first ends thereof to the base 110 and at second ends thereof to local portions 121 of the mobile plate 120. The actuators 131 may be provided as linear actuators that can extend or retract in the Z-direction and thus may be configured to adjust distances between the base 110 and the local portions 121 of the mobile plate 120. In accordance with embodiments, the actuators 131 may be provided in a group of three actuators 131 that are arranged in a triangular formation. As such, by increasing or decreasing the distances between the base 110 and the local portions 121, the actuators 131 can control an attitude of the mobile plate 120 relative to the base 110.

As shown in FIG. 7, the actively controllable actuation system 130 may include a controller 132 that is respectively coupled to each of the actuators 131 and a sensor 133. The sensor 133 may be disposed to sense the degree of parallelism between the first and second components 2 and 3 and may be provided as a pressure sensor at each of the actuators 131. The sensor 133 could thus identify when the first and second components 2 and 3 are brought together in a non-parallel relative orientation since initial contact between the non-parallel first and second components 2 and 3 will read as a high pressure input at the actuator 131 proximate to a "low" side of the first component 2 and as a low or zero pressure input at the actuator 131 proximate to the "high" side.

The controller 132 may include a processing unit 1320 disposed in signal communication with the sensor 132, a memory unit 1321 and servo controllers 1322 that are respectively coupled to each of the actuators 131. The memory unit may have executable instructions stored thereon, which, when actuated, cause the processing unit to receive pressure readings from the sensor 132 of the actuators 131, to determine from those pressure readings a degree of non-parallelism between the first and second components 2 and 3, to determine a corrective action needed to increase the degree of parallelism and issue commands to the servo controllers in accordance with the determined corrective action. The servo controllers may then control the actuators 131 and, in particular, may control the actuator 131 associated with the high pressure reading to retract. In so doing, the controller 132 will thereby lower the mobile plate 120 at the "low" side and to in turn increase the degree of parallelism between the first and second components 2 and 3.

In accordance with aspects, a method of passively or actively affixing the first and second components 2 and 3 to one another is provided. The method includes supporting the mobile plate 40/120 on the base 20/110, which is fixable relative to a first component maneuvering device (i.e., the arm picker 4 of FIG. 1), removably attaching the second component 3 to the mobile plate 40/120, maneuvering the first component 2 toward the second component 3 with the first component maneuvering device and passively or actively manipulating the mobile plate 40/120 to increase a degree of parallelism between the first and second components 2 and 3. In accordance with embodiments, the passive manipulating may include deforming the flexible membrane 30 whereas the active manipulating may include adjusting the distance between the mobile plate 120 and the base 110.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A bondline control fixture for affixing first and second components, the bondline control fixture comprising:
   a base fixable relative to a first component maneuvering device and comprising a first body defining an aperture and a first chamber and a second body disposable within the first chamber and defining a second chamber;
   a flexible membrane disposable to seal the second chamber;
   a mobile plate to which the second component is removably attachable, the mobile plate being disposable in contact with the flexible membrane; and
   a pressure regulating system coupled to the second body and configured to regulate a pressure within the second chamber to deform the flexible membrane.

2. The bondline control fixture according to claim 1, wherein the first component comprises a flexible polymer component and the second component comprises a photonic integrated circuit.

3. The bondline control fixture according to claim 1, wherein the first body comprises sidewalls and a work surface supportable on the sidewalls, wherein the work surface is formed to define the aperture and a groove in communication with the aperture.

4. The bondline control fixture according to claim 1, wherein the flexible membrane comprises:
   a first section interposable between the first and second bodies; and
   a second section disposable to hermetically seal the second chamber.

5. The bondline control fixture according to claim 1, wherein the flexible membrane comprises rubberized material.

6. The bondline control fixture according to claim 1, wherein the mobile plate is sized to movably fit within the aperture.

7. The bondline control fixture according to claim 1, wherein the mobile plate is sized to rotatably fit within the aperture.

8. The bondline control fixture according to claim 1, wherein the second component is vacuumed onto the mobile plate and adhesive is dispensed on its top surface.

9. An active bondline control fixture for affixing first and second components, the active bondline control fixture comprising:
   a base fixable relative to a first component maneuvering device, the base defining an aperture and a chamber;
   a mobile plate to which the second component is removably attachable, the mobile plate being disposable at least partly in the aperture; and
   an actively controllable actuation system configured to adjust an attitude of the mobile plate relative to the base in accordance with a degree of parallelism between the first and second components.

10. The active bondline control fixture according to claim 9, wherein the actively controllable actuation system comprises actuators disposed within the chamber that are each coupled to the base and a local portion of the mobile plate and configured to adjust a distance between the base and the local portion.

11. The active bondline control fixture according to claim 10, wherein the actively controllable actuation system comprises a controller coupled to each actuator and configured to control an operation of each actuator in accordance with the degree of parallelism.

12. The active bondline control fixture according to claim 11, wherein the actively controllable actuation control system comprises a sensor disposed to sense the degree of parallelism.

13. The active bondline control fixture according to claim 12, wherein the actively controllable actuation control system comprises a pressure sensor at each of the actuators.

14. The active bondline control fixture according to claim 10, wherein the actuators are arranged in a triangular formation.

15. The active bondline control fixture according to claim 10, wherein each actuator comprises a linear actuator.

16. The active bondline control fixture according to claim 9, wherein the mobile plate is sized to movably fit within the aperture.

17. The active bondline control fixture according to claim 9, wherein the mobile plate is sized to rotatably fit within the aperture.

* * * * *